US011976938B2

United States Patent
Pan et al.

(10) Patent No.: US 11,976,938 B2
(45) Date of Patent: May 7, 2024

(54) CROWD-DRIVEN MAPPING, LOCALIZATION AND SOCIAL-FRIENDLY NAVIGATION SYSTEM

(71) Applicant: THE UNIVERSITY OF HONG KONG, Hong Kong (HK)

(72) Inventors: Jia Pan, Hong Kong (HK); Tingxiang Fan, Hong Kong (HK); Dawei Wang, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 140 days.

(21) Appl. No.: 17/751,713

(22) Filed: May 24, 2022

(65) Prior Publication Data

US 2022/0390256 A1    Dec. 8, 2022

Related U.S. Application Data

(60) Provisional application No. 63/196,717, filed on Jun. 4, 2021.

(51) Int. Cl.
*G01C 21/00* (2006.01)
*G06F 18/23213* (2023.01)

(52) U.S. Cl.
CPC ... *G01C 21/3837* (2020.08); *G06F 18/23213* (2023.01)

(58) Field of Classification Search
CPC ............ G01C 21/3837; G06F 18/23213
See application file for complete search history.

(56) References Cited

U.S. PATENT DOCUMENTS

| | | | | |
|---|---|---|---|---|
| 2012/0046860 | A1* | 2/2012 | Curtis ............... | H04W 12/02 701/418 |
| 2017/0102703 | A1* | 4/2017 | Lynch ............... | B62D 15/025 |
| 2017/0103259 | A1* | 4/2017 | Anastassov ...... | G06V 20/582 |
| 2018/0017406 | A1* | 1/2018 | Semnani ........... | G01C 21/206 |
| 2019/0339709 | A1* | 11/2019 | Tay ................... | G06Q 10/02 |
| 2020/0219389 | A1* | 7/2020 | Hacker ............. | G08G 1/0133 |
| 2020/0225053 | A1* | 7/2020 | Rus .................. | G05D 1/0214 |

OTHER PUBLICATIONS

Lorenzo Bertoni, MonoLoco: Monocular 3D Pedestrian Localization and Uncertainty Estimation, EPFL VITA labCH-1015 Lausanne, arXiv:1906.06059v2 [cs.CV] Aug. 20, 2019.
Panpan Cai, LeTS-Drive: Driving in a Crowd by Learning from Tree Search, School of Computing, National University of Singapore, 117417 Singapore.

(Continued)

*Primary Examiner* — Seth A Silverman
(74) *Attorney, Agent, or Firm* — Amin, Turocy & Watson, LLP

(57) ABSTRACT

Disclosed are methods of navigating a robot in a crowd involving mapping a local crowd and applying a clustering algorithm that reconstructs a crowd-flow map capturing movement patterns of pedestrians in the local crowd; using a flow-matching metric, localizing the robot in the crowd-flow map; and following a movement pattern in the crowd-flow map using a hierarchical crowd-driven planning on a long time horizon and a short time horizon.

20 Claims, 11 Drawing Sheets

(56) References Cited

OTHER PUBLICATIONS

Chen, Yu Fan, "Decentralized Non-Communicating Multiagent Collision Avoidance with Deep Reinforcement Learning." 2017 IEEE International Conference on Robotics and Automation (ICRA), May 2017, Singapore, Singapore, 2017.
Sean Curtis, Menge: A Modular Framework for Simulating Crowd Movement, Collective Dynamics 1, A1:1-40 (2016).
Frank Dellaert, Monte Carlo Localization for Mobile Robots, Computer Science Department, Carnegie Mellon University, Pittsburgh PA 15213 Institute of Computer Science III, University of Bonn, D-53117 Bonn.
Everett, Michael, "Motion Planning Among Dynamic, Decision-Making Agents with Deep Reinforcement Learning.".
Peter E. Hart, Correction to a Formal Basis for the Heuristic Determination of Minimum Cost Paths, Bertram Raphael Artificial Intelligence Center, Stanford Research Institute Menlo Park, California 94025.
Peter Henry, Learning to Navigate Through Crowded Environments, 1University of Washington, Department of Computer Science & Engineering, Seattle, WA 2Neuroinformatics and Cognitive Robotics Lab, Ilmenau University of Technology, Germany.
Anoop Aroor, Online Learning Online Learning and Planning and Planning for Crfor Crowd-awarowd-aware Sere Service Robotvice Robot NaNavigationvigation, ity UnivCity University of New Yersity of New York (CUNork (CUNYY)) CUNCUNY Academic Y Academic WWorksorks.

\* cited by examiner

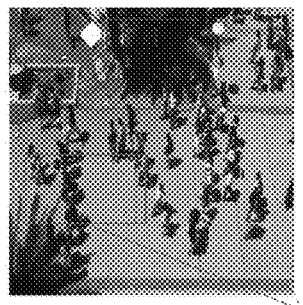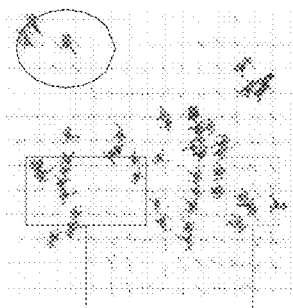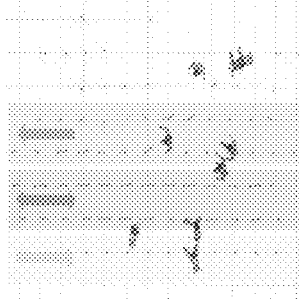
Fig. 1(a)　　　　　　　　　　Fig. 1(b)
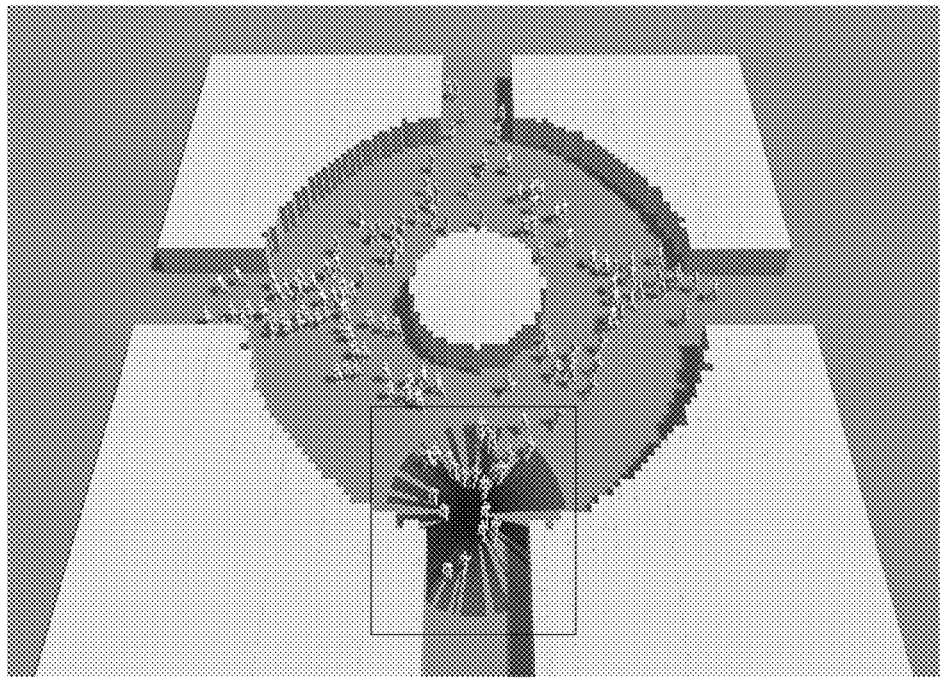
Fig. 2(a) Crowd Simulation in Gazebo

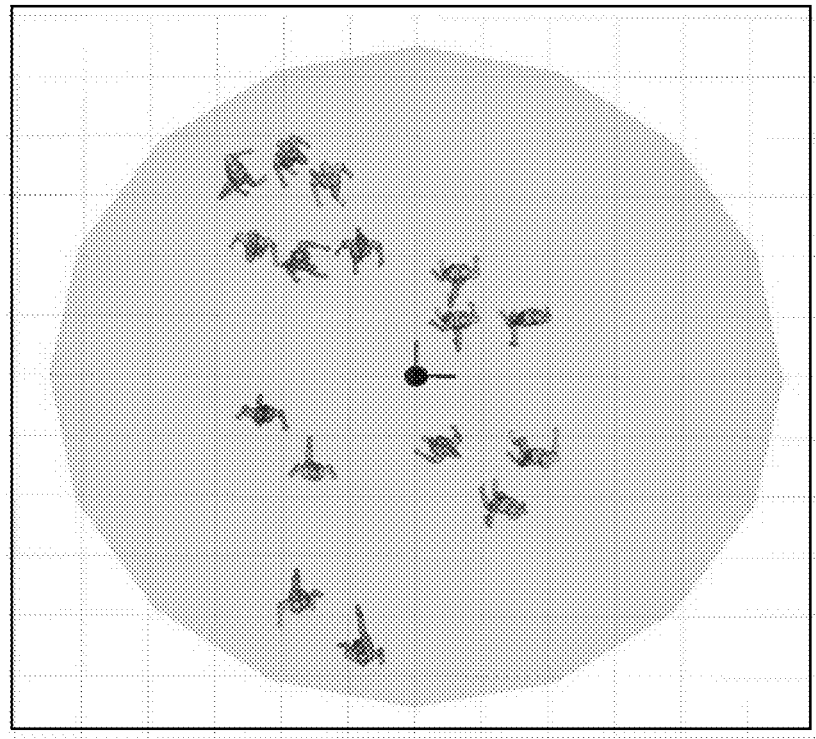
Fig. 2(b) Local Perception
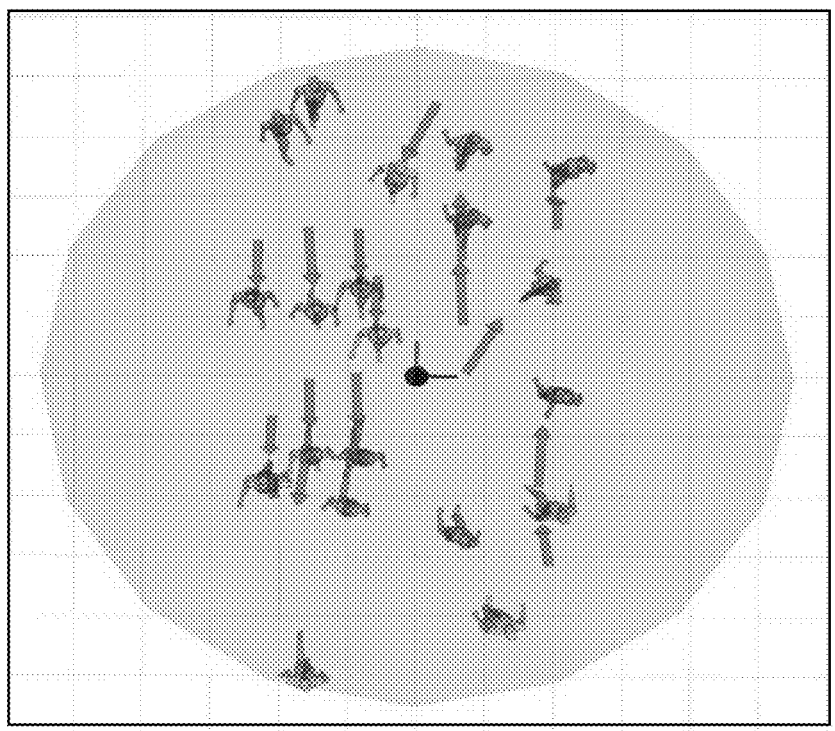
Fig. 2(c) Motion of Pedestrians

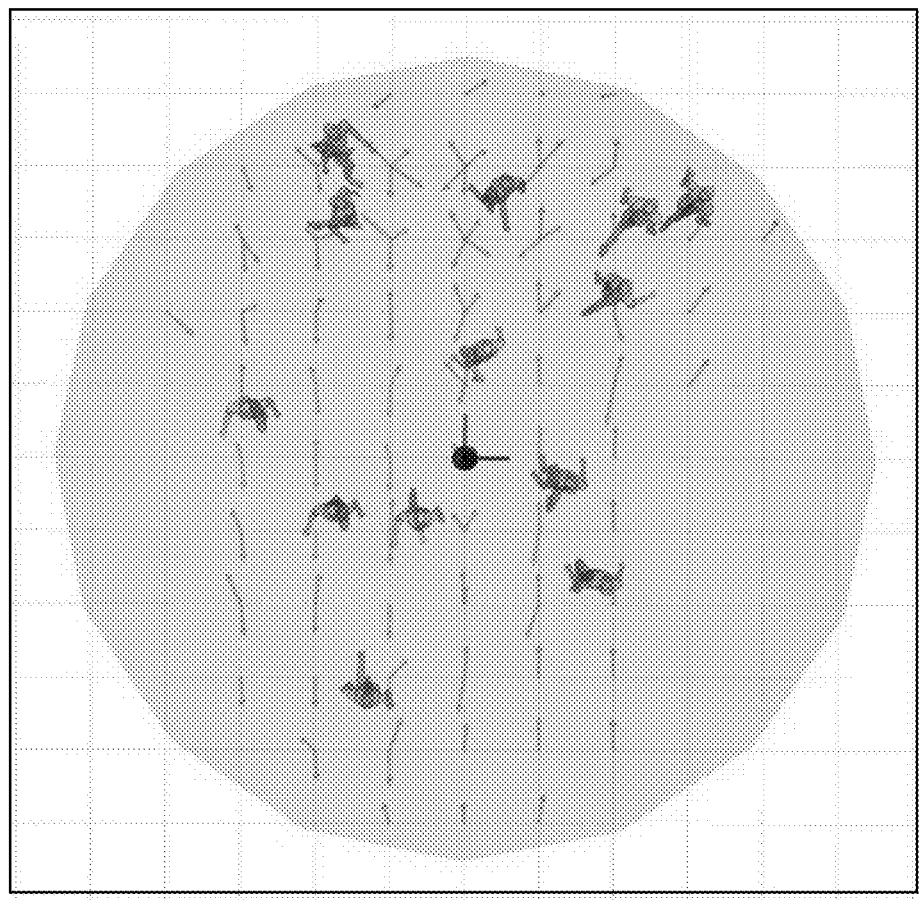
Fig. 2(d) Crowd-Flow Map
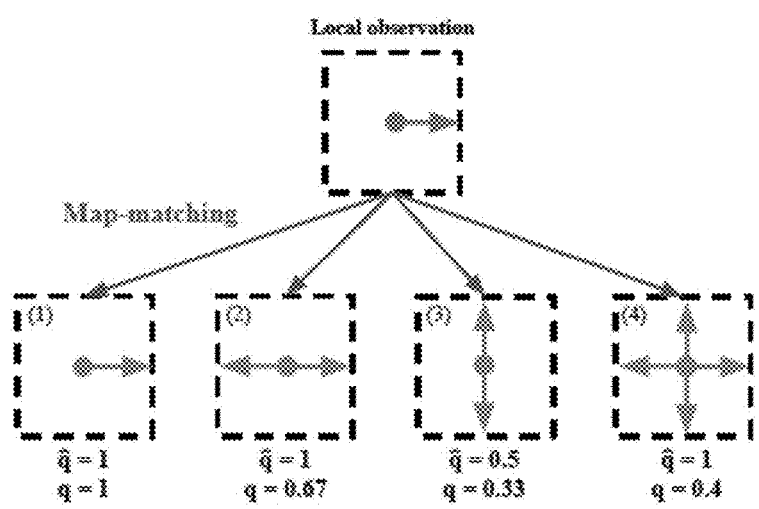
Fig. 3

Algorithm 1 Navigation cost computation for a robot's possible movement

1: Input: The crowd-flow map $M$, the robot's current cell location $p$, the robot's one possible movement $v^{robot}$, weights $w_{rc}$ and $w_{lc}$ for resistance and lubricating costs respectively.
2: $Cost = \|v^{robot}\|$
3: $[RC_p, LC_p] = [0, 0]$
4: // Compute the crowd-flow cost at the current location
5: for $v^{flow}$ in $M(p)$ do
6: $\quad RC_p \mathrel{+}= v^{robot} \cdot (-v^{flow}), LC_p \mathrel{+}= \|v^{robot} \times v^{flow}\|$
7: end for
8: $RC = RC_p, LC = LC_p$
9: // Sum up all cost with weights
10: $Cost \mathrel{+}= w_{rc} \cdot RC + w_{lc} \cdot LC$
11: Output: $Cost$

Fig. 4

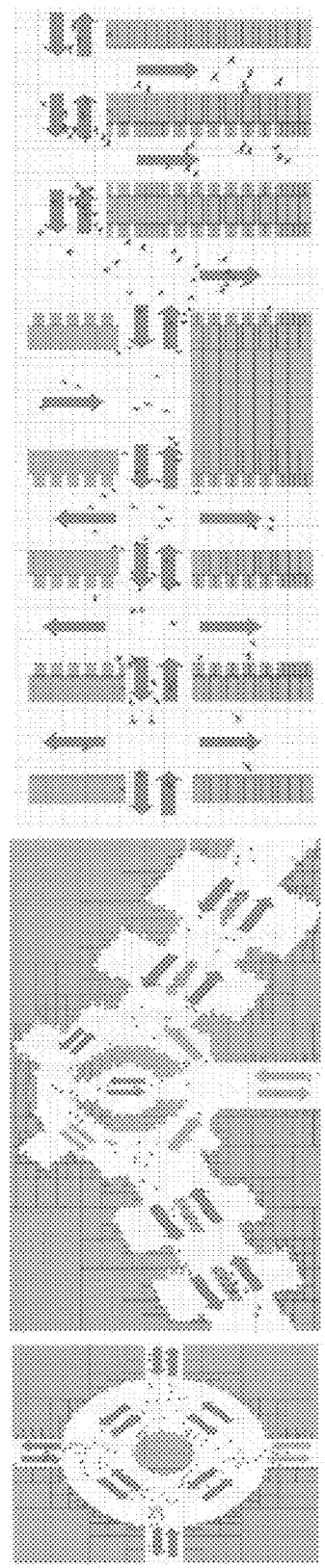
Fig. 5(a) Fountain
Fig. 5(b) Conference Venue
Fig. 5(c) Canteen

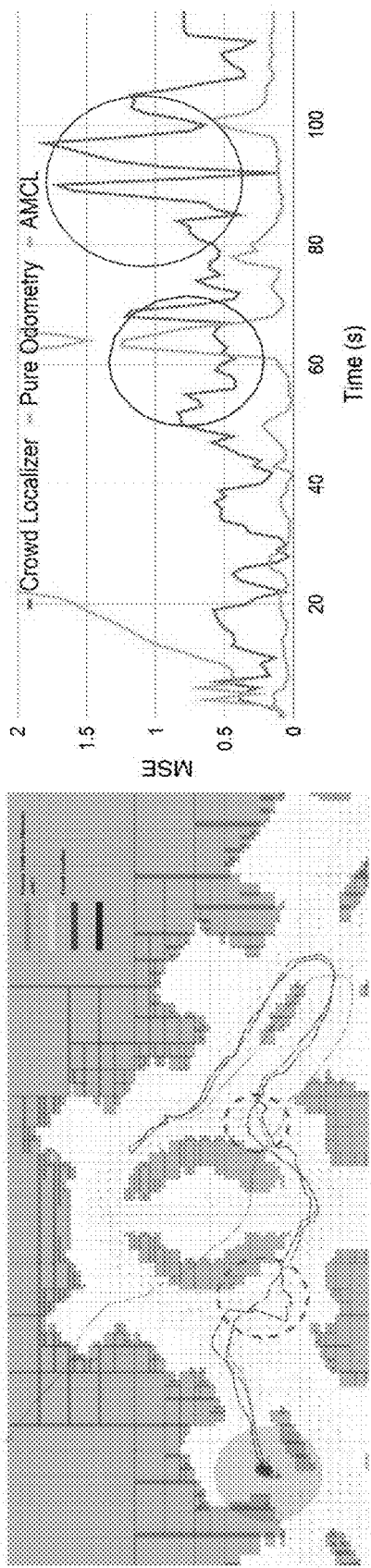
Fig. 7(a)
Fig. 7(b)
Fig. 8(a)
Fig. 8(b)
Fig. 8(c)
Fig. 8(d)

Table 1: The MSE of trajectories in the testing scenarios: Fountain, Canteen, and Conference Venue.
| Method | Fountain | Canteen | Conf. Venue |
|---|---|---|---|
| Pure Odometry | 3.470 | 18.915 | 6.188 |
| AMCL | 9.029 | 0.610 | 0.105 |
| CrowdLocalizer | 0.586 | 0.599 | 0.613 |
Fig. 9
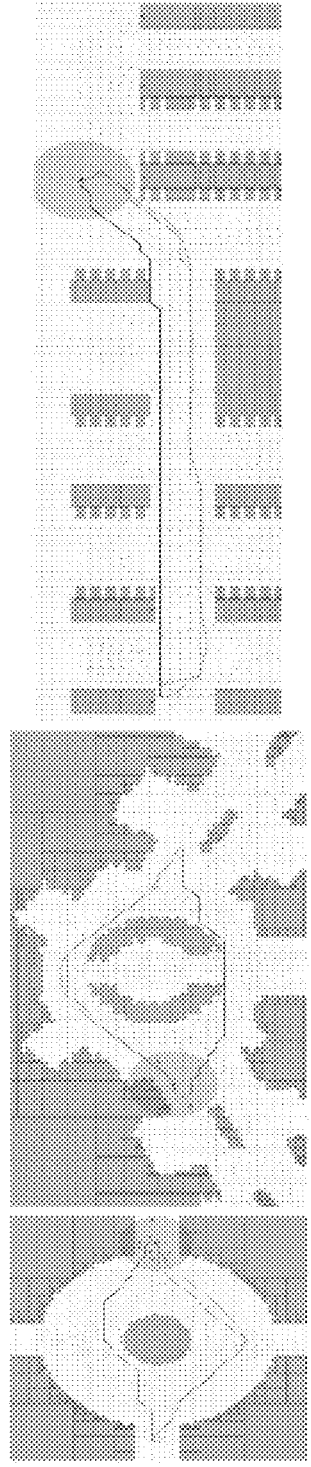
Fig. 10
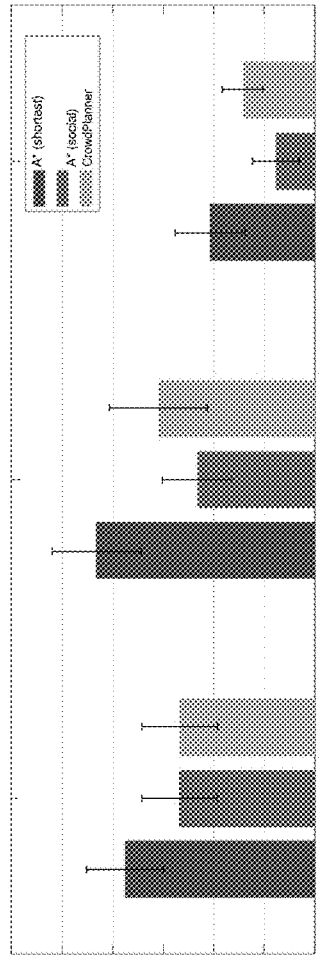
Fig. 11

Table 2: Comparison experiments measured by the success rate and the number of executed collision avoidance actions (mean/std).

| Method | | Fountain | | Canteen | | Conf. Venue | |
|---|---|---|---|---|---|---|---|
| Localizer | Planner | Success rate | # CA actions | Success rate | # CA actions | Success rate | # CA actions |
| AMCL | A* (shortest) | 92% | 39.26 (11.34) | 90% | 36.20 (7.83) | 100% | 22.80 (8.34) |
| | A* (social) | 34% | 34.38 (8.11) | 86% | 31.91 (8.73) | 100% | 11.40 (6.24) |
| | CrowdPlanner | 52% | 43.87 (12.92) | 80% | 40.36 (7.69) | 100% | 19.16 (8.78) |
| CrowdLocalizer | A* (shortest) | 90% | 54.62 (14.31) | 82% | 40.96 (12.92) | 98% | 25.06 (7.44) |
| | A* (social) | 86% | 44.71 (15.36) | 84% | 30.71 (10.56) | 92% | 11.85 (10.14) |
| | CrowdPlanner | 96% | 40.38 (12.08) | 90% | 29.58 (9.64) | 84% | 25.44 (7.68) |

Fig. 12 ately even with the recent progress in computer vision. Such filtering also discards the rich human-robot interaction information that is helpful for achieving social-friendly robot behaviors.

CROWD-DRIVEN MAPPING, LOCALIZATION AND SOCIAL-FRIENDLY NAVIGATION SYSTEM

CROSS REFERENCE TO RELATED APPLICATIONS

This application claims priority to U.S. Provisional application Ser. No. 63/196,717, filed on Jun. 4, 2021, which is incorporated herein by reference.

TECHNICAL FIELD

Disclosed are robot navigating systems, methods of navigating a robot within a crowd, robots, and associated technologies.

BACKGROUND

Navigating a mobile robot in dynamic human scenarios has a wide variety of applications, including last-mile delivery, service robot in malls, and surveillance. However, most existing navigation algorithms only work well in scenarios with only a few or no people due to two main challenges in dense crowds.

First, the existence of moving obstacles like pedestrians can occlude the robot's observation, interfering with robots' mapping, and localization. In a dense crowd, a robot is difficult to figure out the layout of surrounding environment and its accurate location using the classical simultaneous localization and mapping (SLAM) framework, because the existence of moving obstacles like pedestrians can occlude the robot's observation and the landmark features may be confused with features on moving objects, resulting in mistakes in correspondence calculation. Thus, prior works often treat moving objects as interference and intend to filter them out from the sensory observation, which unfortunately is difficult to be implemented robustly even with the recent progress in computer vision. Such filtering also discards the rich human-robot interaction information that is helpful for achieving social-friendly robot behaviors.

Second, a robot is difficult to accomplish safe and effective planning in highly dynamic environments. In a dense crowd, a robot is difficult to accomplish safe and effective navigation without getting stuck in crowds. Some recent works consider pedestrians as moving obstacles and use either reactive policies or short-horizon planning to trade-off collision avoidance and goal approaching. However, these methods do not model social-awareness and thus the resulting robot motion may be safe but intimidating, e.g., the robot may abruptly accelerate or stop towards its neighbors' tiny movements. Such overly responsive behavior disturbs the normal crowd behavior and significantly reduces the robot's social-friendliness and navigation effectiveness.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

To address challenges described in the Background, the observations of nearby pedestrian crowds are used as another type of sensory measurement about the surrounding environment with crowds. In particular, the movement information of pedestrians, which is commonly treated as harmful information in exiting navigation methods, is utilized for mapping, localization, and planning. Compared with the geometry map in exiting navigation methods, the crowd-flow map further described herein provides a new perspective for robots better understanding their surrounding dynamic scenarios. The observed crowd flow can be used to infer the traversability of different locations in the scene and the crowd's social moving preferences, including rules of left/right-hand traffic, crossing, and overtaking. As a result, a mapping, localization, and social-friendly navigation algorithm is described herein based on the crowd-flow. The algorithm can complement the existing navigation algorithm based on geometry-structure but result in more social-friendly navigation behavior in dense scenarios.

Disclosed herein are methods of navigating a robot in a crowd involving mapping a local crowd and applying a clustering algorithm that reconstructs a crowd-flow map capturing movement patterns of pedestrians in the local crowd; using a flow-matching metric, localizing the robot in the crowd-flow map; and following a movement pattern in the crowd-flow map using a hierarchical crowd-driven planning on a long time horizon and a short time horizon.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 1 depicts two real-world examples illustrating two types of latent social information in crowd flow: FIG. 1(a) crowd flow indicates the region traversability and scene's moving preference; and FIG. 1(b) crowd flow encodes the scene's social navigation rules.

FIG. 2 depicts the CrowdMapper pipeline. FIG. 2(a): the simulated crowded scenario, with the local region around the robot highlighted; FIG. 2(b): the robot's observation, where the blue circle indicates the perception region; FIG. 2(c): the captured motion vector field of the robot's nearby pedestrians; and FIG. 2(d): the recovered the time-invariant crowd-flow feature that will be fused into the global crowd-flow map.

FIG. 3 depicts an example of the flow-matching metric. Assume that the observed crowd flow in the current grid cell is moving toward right, and there are four hypothesis cells in the map as shown in the bottom. The computed matching quality q when the hyper-parameter $\gamma=0.5$ is listed for each candidate, where a larger q indicates a higher matching quality.

FIG. 4 describes a first exemplary algorithm.

FIGS. 5(a), 5(b), and 5(c) depict different benchmark scenarios. The blue arrows indicate crowd motion patterns. (a) is a 50×50 m² fountain scene whose crowd density is 0.130/m²; (b) is a 100×50 m² conference venue scene whose crowd density is $0.045/m^2$; (c) is a $100\times25\ m^2$ canteen scene whose crowd density is $0.081/m^2$.

FIG. 7 depicts a localization example in a Conference Venue scene. FIG. 7(a) depicts trajectories generated by various methods, and FIG. 7(b) depicts localization error.

FIGS. 8(a)-8(d) depict the localization quickly adjusting the pose estimation when crowds are observed.

FIG. 9 reports Table 1.

FIG. 10 depicts trajectories planned by different approaches. The blue curve is the result of A* (shortest); the orange curve is result of A* (social), and is also the plan for CrowdPlanner using D* at time 0; the green curve is the final trajectory of CrowdPlanner after D* replanning.

FIG. 11 depicts a graph of the numbers of collision avoidance actions in trajectories planned using different approaches in benchmark scenarios (from right to left: fountain, conference, and canteen.)

FIG. 12 reports Table 2.

DETAILED DESCRIPTION

Figure 6A:
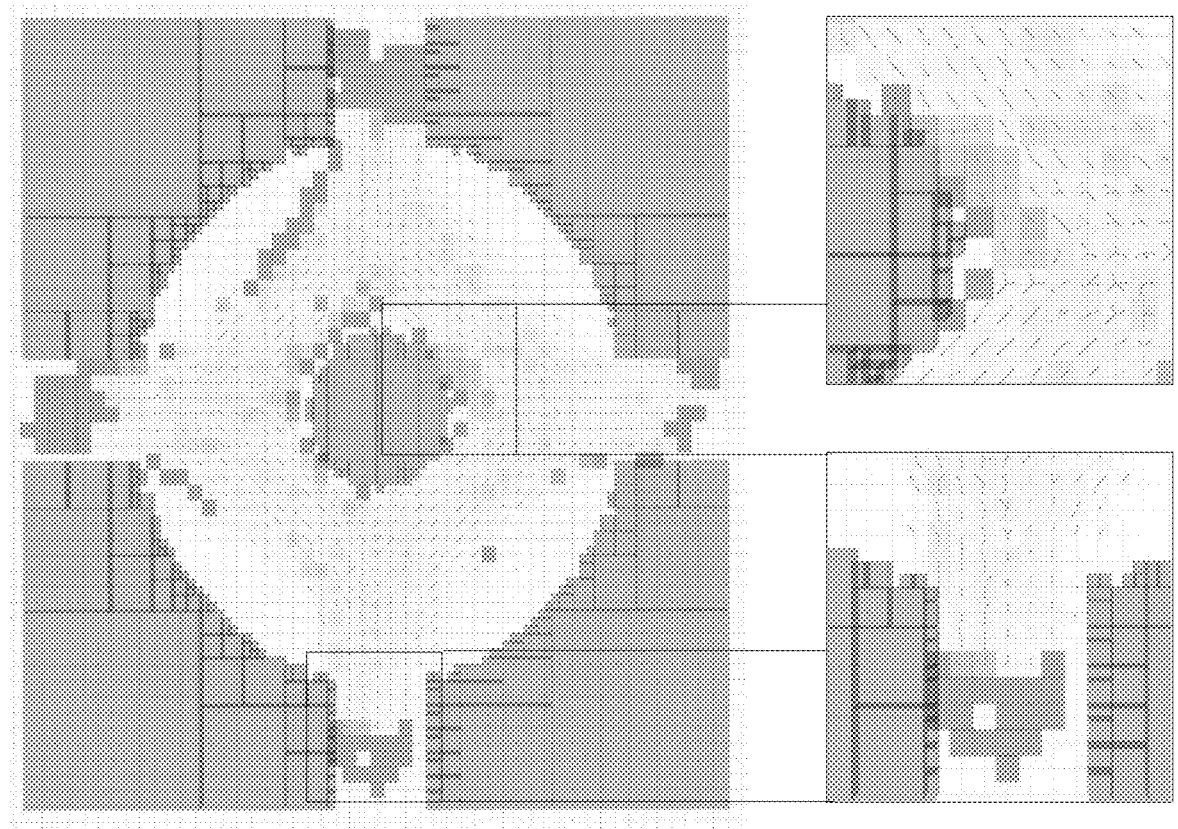
FIG. 6(a) depicts a heatmap for fountain scene's map quality. The darkness of the red color indicates the loss magnitude.

Navigation in dense crowds is a well-known open problem in robotics with many challenges in mapping, localization, and planning. Traditional solutions consider dense pedestrians as passive/active moving obstacles that are the cause of all troubles: they negatively affect the sensing of static scene landmarks and must be actively avoided for safety. Herein, provided is a new perspective: the crowd flow locally observed can be treated as a sensory measurement about the surrounding scenario, encoding not only the scene's traversability but also its social navigation preference. Herein, it is demonstrated that even using the crowd-flow measurement alone without any sensing about static obstacles, the methods herein still accomplish good results for mapping, localization, and social-aware planning in dense crowds.

Conventional robot mapping, localization, and planning methods 1) only using geometry-level scene understanding 2) difficult to localize robots' position due to the partial occlusion by pedestrians 3) only following the shortest trajectory without considering the social norm.

Techniques are described herein, and specifically an algorithm described herein is able to 1) use local crowd observation as sensory measurement and apply a clustering algorithm to reconstruct a crowd-flow map capturing the movement pattern of pedestrians in the scenario, which allows a social-level understanding about surrounding dynamic scenarios; 2) use a flow-matching metric to leverage the crowd-flow map to localize robots' position in dense crowds; and 3) allow a robot to follow the movement pattern in the crowdflow map and accomplish social-aware planning.

Crowd-Driven Mapping System
 (1) The system leverages the local crowd-flow around robots as the sensory measurement for mapping, which can be reliably collected nowadays using pedestrian detection and tracking technique.
 (2) Given local crowd-flow observations, the system next uses K-means clustering to recover time-invariant crowd-flow patterns locally around the robot.
 (3) To construct a global crowd-flow map, the system fuses the local maps obtained in an online manner when robots are moving around in the scenario.

Crowd-Driven Localization System

The crowd-driven localization mainly bases on the particle-filter localization framework, which includes three repetitive steps:
 (1) Generating some hypothesis samples for robot locations as the conventional/traditional method.
 (2) Computing the weight for each sample by evaluating the hypothesis quality in terms of the matching quality between the observation and map locally around the hypothesis. In particular, the flow-matching metric is designed to evaluate the matching quality between the local crowd observation and the crowd-flow map locally around a given location hypothesis.
 (3) Important sampling to update the hypothesis samples as the conventional/traditional method.

Moreover, it is worth noting that our flow-matching metric is complementary with the traditional geometry-matching metric, and both metrics can be employed simultaneously to fuse the crowd and geometry information. In particular, the crowd-matching metric is desirable in highly dynamic scenarios like human crowds while the geometry-matching metric is more helpful in static scenarios.

Crowd-Driven Planning System

Planning is separated into two parts.
 (1) In a long horizon, the robot follows the global patterns in the existing crowd-flow map and plans a minimum cost trajectory connecting the robot's current location and its goal.
 (2) In a short horizon, the robot uses efficient re-planning to update the long horizon plan with online observed local crowd flow data, which is also beneficial for imperfect localization.

The planning system is formulated as a search over the crowd-flow grid map, whose topology is defined by eight-neighborhood, i.e., the robot can move in eight different directions. Since imperfect localization needs frequent replanning, the D* as the default planner, though other solvers such as A* can also be used.

For the search-based planner, we need to specify cost and cost-to-go functions over the grid map for designing search heuristics. The same cost-to-go function is used as the geometry grid map, but a new cost function is designed to encourage the robot to follow crowd flow patterns. In particular, besides the traditional cost of penalizing the long-distance movement, the resistance cost and lubricating cost are also considered.

In Summary
 (1) The system described herein introduces the local crowd-flow around the robot as the sensory measurement for robot mapping, localization, and planning.
 (2) The crowd-driven mapping sub-system uses K-means clustering to recover time-invariant crowd-flow patterns locally around the robot.
 (3) The crowd-driven localization sub-system proposes the flow-matching metric to evaluate the matching quality between the local crowd observation and the crowd-flow map locally around a given location.
 (4) The hierarchical crowd-driven planning sub-system separates long time horizon and short time horizon.

(5) The crowd-driven planning sub-system develops the resistance cost and lubricating cost to encourage the robot following crowd-flow patterns.

Even assuming a robot has no sensor mechanism for measuring geometry of static obstacles and can only perceive the movement of nearby pedestrians, motivated by human's behaviors in FIG. 1, a robot can accomplish mapping, localization, and planning, because the observed vector field of local crowd flow can be used to infer the traversability of different locations in the unstructured scene and the crowd's social moving preferences, including rules of left/right hand traffic, crossing and overtaking. These two types of crowd latent information facilitate achieving mapping, localization, and social-friendly navigation in dense crowd scenes.

To accomplish this, a novel framework, called Crowd-Mapping is described herein, for robotic navigation in dense crowds. The technology includes three modules: 1) Crowd-Mapper uses local crowd observation as sensory measurement and applies clustering algorithm to reconstruct a crowd-flow map capturing the movement pattern of pedestrians in the scenario; 2) CrowdLocalizer uses a flow-matching metric to leverage the crowd-flow map for localization; and 3) Crowd Planner allows a robot to follow the movement pattern in the crowd-flow map and accomplish social-aware planning.

Crowd-Flow Estimation

To capture the crowd-flow pattern of the environment, many estimation methods exist. According to the observation perspective, crowd-flow estimation methods can be categorized into two types, global and local methods. The global estimation methods use global cameras or drones to obtain observation of the crowd flow in the entire scene. However, the global observation is often unattainable for robots due to the limited viewports of on-board sensors. Thus, local estimation methods are proposed to estimate the crowd flow around the robot. Many technologies achieved real-time pedestrian flow tracking by on-board sensors. Compared to the global estimation approaches, however, these local methods with limited perceptive are more likely to encounter the occlusion issue. To overcome it, some studies propose the more robust occlusion-aware estimation approaches for tracking systems.

Crowd-Flow Navigation

Navigation in crowd-flow involves the complex human-robot interaction. Some previous works on crowd navigation usually consider pedestrians as dumb moving obstacles that need to be avoided actively. Thus, the resulting robot behavior can be too sensitive to human's subtle movement, which may disturb the pedestrian flow and reduce the throughput of the entire crowd. To eliminate this issue, some methods formulate the social flow factors inside the human-robot inter-action model. For example, an iterative A* algorithm to follow a pedestrian along the crowd flow has been proposed, but it works only when the pedestrian to be followed and the robot share the same goal. In this conventional approach, the robot uses inverse reinforcement learning to imitate the pedestrian's behavior in a crowd for reducing the disturbance between the robot and the crowd. It uses Gaussian processes to online estimate the pedestrian flow vector field in the scenario, but is sensitive to the time-varying crowd mode and thus not appropriate for mapping and localization. More importantly, the mimic policy is not optimal in terms of minimizing the robot-crowd disturbance. It introduces a crowd-aware planner to plan a trajectory that conforms to the social-flow direction and also avoids congestion, but it assumes the global crowd flow field to be static and known beforehand, which unfortunately is often impractical.

CrowdMapping Framework

Our fundamental assumption is that the pedestrian crowd flow can provide sufficient time-invariant features for mapping the navigation scenario. In particular, the moving patterns in the crowd flow reflect the resistance of static obstacles to the crowd movement along different directions: the high resistance along a direction indicates the existence of obstacles along that direction and vice versa. Such resistance effect depends on map layout and pedestrians' moving preference, and thus is mostly time-invariant, making it suitable for map reconstruction. For instance, in the sidewalk scenario shown on the right of FIG. 1(a), there are two types of crowd flow patterns. In the yellow box region, there is no resistance in all directions, thus humans can move freely and their paths may intersect. In the blue box region, people prefer moving along the east-west direction, implying the existence of street boundary that resists human motion in the south-north direction. Such directional resistance can also be used to encode social navigation rules, e.g., the right-traffic rule in FIG. 1(b). Such crowd flow patterns are time-invariant and can be used to reconstruct a map reflecting the navigation constraints posed by the scenario obstacles and social rules. We now describe our novel mapping framework and its applications in three steps.

CrowdMapper

In CrowdMapper, the robot leverages the local crowd distribution around itself as the sensory measurement for mapping, which can be reliably collected nowadays using pedestrian detection and tracking technique, thanks to the progress of computer vision. In particular, at time step t, the robot's local observation about the crowd is $\{m_{t-\Delta Ct}^i\}_{i=1}^N$, where N is the number of pedestrians within the robot's perception range denotes the pedestrian ID in the tracking system, $m_{t-\Delta Ct}^i = [\bar{p}_x, \bar{p}_y, l, \theta] \in \mathbb{R}^4$ is a vector encoding the i-th pedestrian's state in terms of position and velocity at time stop t, where l is the moving distance in $\Delta t$ duration, $\theta$ is the moving direction, and $\bar{p}_x, \bar{p}_y$ are the starting coordinates for the movement. In this paper, we choose $\Delta t = 1$ s to make a good trade-off between tracking fast movements and capturing stable movement patterns in the crowd.

Given local observations $\{m_{t-\Delta Ct}^i\}$, the robot next uses K-means clustering [13] to recover time-invariant crowd-flow patterns locally around. In particular, we first discretize the 2D plane into grid cells $C_r$ at a certain resolution. Then, we assign $m_{t-\Delta Ct}^i$, to different cells using the location $[\bar{p}_x, \bar{p}_y]$. After that, we apply K-means to all velocities $[l, \theta]$ assigned to the same cell to identify the possible navigation directions in each cell. Since the number of clusters is unknown beforehand, inspired by an elbow method, we attempt the cluster number from 1 to the maximum cluster number $N_c$, and choose the final cluster number as the one that does not reduce the total within-cluster sum of square (WSS) value dramatically or whose WSS is below a certain threshold $WSS_m$. Finally the robot can recover the local crowd-flow map.

To construct a global crowd-flow map, the robot needs to fuse the local maps obtained in an online manner when moving around in the scenario. The entire CrowdMapper pipeline is shown in FIG. 2. The constructed crowd-flow map can be applied in many navigation tasks, including but not limited to the localization and social-aware planning tasks that will be described below.

CrowdLocalizer

The robot can localize itself using the online constructed crowdflow map instead of the traditional geometry map. The approach is general and can be integrated in any traditional localization framework, but here the particle-filter based localization framework is used as an example to describe the method.

In concrete, the particle-filter localization includes three repetitive steps: 1) generating $n_p$ hypothesis samples for robot locations, 2) computing the weight for each sample by evaluating the hypothesis quality in terms of the matching quality between the observation and map locally around the hypothesis, and 3) important sampling to update the hypothesis samples. When using the crowd-flow map for localization, steps 1) and 3) are left unchanged, because they are irrelevant to crowd-flow details. We modify step 2) by designing an appropriate metric to evaluate the matching quality between the local crowd observation and the crowd-flow map locally around a given location hypothesis. In particular, we first compute the minimum difference $\theta_m$ between an observed direction $\theta$ and all the possible directions in the grid cell
wherein the location hypothesis locates. Next, we normalize to $\theta_m$ to [0,1] the score $$\hat{q} = \frac{\pi - g_m}{\pi}.$$

in addition, among different hypothesis cells with the same $\hat{q}$ score, we prefer the cell with the minimum number of possible directions, since the corresponding matching is most robust. Thus, we discount $\hat{q}$ with the factor $\gamma \in [0,1]$ and get the final matching score $$q = \frac{1}{1 + (n=1)\gamma} \hat{q},$$

where n is the number of all directions in a hypothesis cell. Note that tuning $\gamma$ can trade off the preference between the diversity and error of the directions. We illustrate the flow-matching metric using a toy example in FIG. 3. Moreover, it is worth noting that our flow-matching metric is complementary with the traditional geometry-matching metric, and both metrics can be employed simultaneously to fuse the crowd and geometry information. In particular, the crowd-matching metric is desirable in highly dynamic scenarios like human crowds while the geometry-matching metric is more helpful in static scenarios.

CrowdPlanner

The rich social navigation information encoded in the constructed crowd-flow map is utilized to accomplish socially-compliant robotic navigation in crowds, which is non-trivial when using traditional geometry map. Although there exist some approaches that can take into account crowd flow into the navigation policy, most of them assume an ideal localization, which is difficult to hold in real-world dense pedestrian scenarios. The solution herein separates planning into two parts: in the long time horizon, the robot follows the global patterns in the existing crowd-flow map and plans a minimum cost trajectory connecting the robot's current location and its goal; in the short time horizon, the robot uses efficient re-planning to update the long horizon plan with online observed local crowd flow data, which is also beneficial for imperfect localization. The planning algorithm is formulated as a search over the crowd-flow grid map, whose topology is defined by eight-neighborhood, i.e., the robot can move in eight different directions. Since imperfect localization needs frequent replanning, we choose D* as the default planner, though other solvers such as A* can also be used. See FIG. 4.

For the search-based planner, it is needed to specify cost and cost-to-go functions over the grid map for designing search heuristics. The cost function defines the transition cost when the robot moves between cells after executing a selected action, and the cost-to-go function estimates the shortest distance from the robot's current position to the goal. The same cost-to-go function as the geometry grid map is used, but the design is a new cost function to encourage the robot following crowd flow patterns. In particular, besides the traditional cost penalizing the long-distance movement, another two costs are considered, the resistance cost (RC) and lubricating cost (LC). Intuitively, RC penalizes the motions that are not consistent with the crowd flow, while LC formulates the fact that moving at directions perpendicular to the possible crowd-flow directions in a cell is likely to meet obstacles and thus should be avoided. To compute the RC cost for the robot at the position p taking the motion $v^{robot}$, we project $v^{robot}$ in the negative direction of every crowd-flow $-v_p^{flow_i}$ in the cell location at p. In this way, we get a scalar cost for each direction, i.e., $RC_p^i = v^{robot} \cdot (-v_p^{flow_i})$. We define the total RC cost at p as $RC_p = \Sigma_i RC_p^i$. For LC cost, we compute a vector $LC_p^i$ as the cross product of $v^{robot}$ and $v_p^{flow_i}$, i.e. $LC_p^i = \|v^{robot} \times v_p^{flow_i}\|$. The total LC cost is defined as $LC_p = \Sigma_i LC_p^i$.

Intuitively, the negative value of RC implies that the robot movement is consistent with the crowd flow and thus the resulting navigation behavior is social-friendly, and vice-versa. LC is always positive, and a higher LC value means that the movement in this cell has lower lubrication, i.e., has a higher chance to collide with static obstacles. These two costs are combined with the traditional distance-based cost with suitable blending weights (i.e. wre and wle) and the entire procedure for computing the crowd-aware navigation cost is shown in the algorithm of FIG. 4.

EXAMPLES

The implementation details of the technology are described. The mapping algorithm is analyzed in different scenarios and then the applicability of the crow-flow map for localization and planning in a crowded scenario is validated. Finally, the proposed approach is compared with two baseline methods.

Implementation Details

The simulation experiments are implemented on a PC with an Intel i7-9700 CPU and an NVIDIA RTX 2060 GPU. As shown in FIG. 2, a Gazebo is used for simulating the mobile Turtlebot platform with a 5 m perception range; Menge is used for simulating realistic crowd behaviors. The hyper-parameters used in the experiments are summarized as follows. For CrowdMapper, the elbow clustering threshold is set $WSS_m$ as 0.5. For CrowdLocalizer, The particle number $n_p$ is set to 500 and the crowd-flow matching metric parameter $\gamma$ is set as 0.5. For CrowdPlanner, $w_{rc}$ is set to 1.0 and $w_{lc}$ is set to 0.5 because RC should be more important than LC for planning in crowds.

Results for Crowd-Driven Mapping

To evaluate the performance of our proposed algorithms, several indoor and outdoor scenarios are set up with different crowd densities, as shown in FIG. 5. To quantitatively measure CrowdMapper's quality, the crowd information captured by an imaginary bird-view camera that globally and perfectly monitors the entire scenario to compute the ground-truth crowd flow field as the baseline is used. The errors between the baseline and our reconstructed crowd-flow map are used to investigate whether the time-invariant movement patterns of pedestrians are well captured. For the error metric, since the methodology measures the difference in flow, the flow-matching metric from the CrowdLocalizer section are borrowed. However, since the direction variance in a cell is not important, $\hat{q}$ is used rather than q as the error metric for a single grid cell. The average error is calculated over all cells as the error over the entire grid-based map.

Figure 6B:
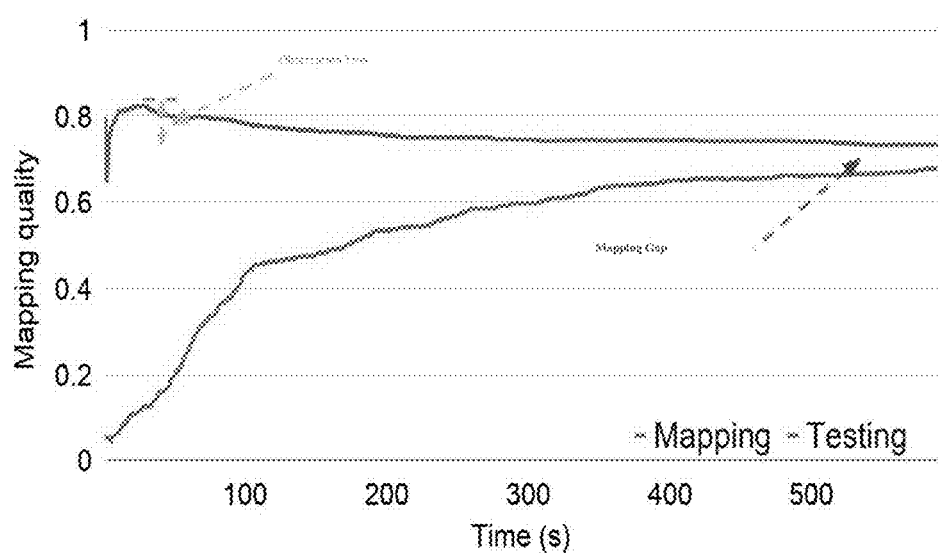
FIG. 6(b) depicts the map quality of the mapping and testing stages over different time steps.

The mapping result is analyzed in two separate stages, the mapping stage and testing stage, as shown in FIG. 6(b). In the mapping stage, the mapping quality increases when the robot explores the scenarios but eventually it converges to a fixed value, marked by the blue dash line in FIG. 6(b). Apparently the mapping quality is not perfect (i.e., <1), which can be explained by two main challenges. First, the crowd flow in a cell is only discretized into eight directions and thus the robot cannot accurately model regions with complex crowd flow. Second, the robot only has partial observation to the scenario and may miss areas with a few pedestrians or crowds appearing in a period when it is absent. After the mapping stage completes, the obtained global crowd-flow map is compared with the pedestrian motion field real-time captured by the imaginary bird-view camera for a series of frames. As shown in FIG. 6(b), the mapping quality is unstable at the beginning, and after a while gradually decreases until it converges to another fixed value marked by the red dashed line in FIG. 6(b). The slow declined tail in the procedure can also be explained by robot's partial observation, since the global camera can observe crowd flow appearing in regions with rare human activity while the robot cannot. A more detailed analysis about this phenomenon in the next paragraph. Note that there is a small gap between the red and blue dashed lines. This is because the robot affects the movement of surrounding pedestrians during the mapping stage but not during the testing stage.

A detailed analysis about the error distribution using the fountain scenario as an example is provided. In FIG. 6(a) the heatmap of the converged quality loss (i.e. 1−matching quality) is plot in the testing stage. Two main types of poor matching regions are observed. First, in some areas, the robot can hardly observe any crowd, which leads to a significant inconsistency with the observation from the bird-view camera. These areas are often near the boundary of crowd-flow map, as shown by the zoomed-in region in the bottom-right of FIG. 6(a). Second, the robot indeed observes the crowd motion in some areas, but the observed data is insufficient for computing accurate time-invariant features, e.g., the region shown in the zoomed top-right in FIG. 6(a). However, as shown in the heatmap, the mapping approach can obtain a high quality crowd-flow map correctly reflecting the layout of the entire scenario.

Results for Crowd-Driven Localization and Planning

After constructing a crowd-flow map, we next investigate whether CrowdLocalizer and Crowd Planner can leverage the map to achieve localization and planning. Here, these two modules are evaluated separately, i.e., evaluating first the localization ac-curacy, and then the planning performance assuming perfect localization. Planning under imperfect localization is discussed in the next section.

The localization accuracy is computed as the Mean Square Error (MSE) between the ground truth and estimated paths. To better understand the effectiveness of CrowdLocalizer, it is compared with two baseline methods: the pure odometry method and a geometry-based particle filter method AMCL, both are implemented in ROS.

One qualitative comparison between these methods is shown in FIG. 7 on the conference venue benchmark. Both CrowdLocalizer and AMCL can well amend odometry sensor's cumulative errors. However, since they use different sensory observations (geometry for AMCL and crowd for CrowdLocalizer), their localization error distributions are different. For AMCL, the localization drift may occur around the intersection of crowds where people occlude most static landmarks, as shown by the red dashed circle in FIG. 7. In contrast, the localization drift of CrowdLocalizer usually appears in areas with sparse pedestrians, as shown by the green dashed circle in FIG. 7. When the observed pedestrian number increases, the drift can be effectively corrected, as shown in FIG. 7.

Similar results are also observed in quantitative experiments, where the robot moves for 300 seconds in the benchmark scenarios and compute the average MSE of each trajectory. The results in Tab. 1 of FIG. 9 indicate that, as the crowd density increases, the localization error of AMCL gradually increases while the error of CrowdLocalizer is relatively stable and even slightly decreases. In general, traditional localization approaches is more advantageous in regions with a few people, while the method outperforms in dense crowds. By combining traditional approaches, the method herein can solve localization tasks in general scenarios with varying crowd density.

The performance of the planning module in term of social-friendly crowd navigation under perfect localization is evaluated. Given a planning result, the robot follows the plan and meanwhile actively avoid collisions with nearby pedestrians using a state-of-the-art reactive collision avoidance policy. A high-quality plan is expected to minimize the inter-disturbance with the crowd. Thus the number of the robot's active collision avoidance actions (i.e. #CA actions) used during the navigation to quantify whether the planned path is socially compliant. Motivated by the fact that a plan passes through open space, which has the minimum inter-disturbance with the crowd, should be a smooth path with limited acceleration, the acceleration is used in the path over a short period of $t_{traj}$ as a signal to detect CA actions. If the acceleration exceeds a predefined threshold $v_{thres}$, the robot is considered as taking a CA action at that time. Through the experiments, the CA actions can be well detected with $t_{traj}$=0.5 s and $v_{thres}$=0.15 m/s². Furthermore, the shortest trajectory planned by A* (i.e. A* (shortest)), is compared with trajectories that take into account the crowd-flow map but using different solvers A* (i.e. A* (social)) and D* (i.e. CrowdPlanner).

Since the crowd motion is random in simulation, each planning algorithm is run for 50 times in each testing scenario and then the different trajectory plans are compared, as demonstrated in FIG. 10. The planners (i.e. Crowd-Planner and A* (social)) considering the social flow are prone to generate a crowd-following trajectory, though their paths can be longer than that of A* (shortest) planner that is not social aware. In addition, #CA actions a robot execute are counted during the navigation and the results are summarized in FIG. 11. The social-aware planners outperform the A* (shortest) planner.

Comparison of Complete Navigation Systems

Finally, the crowd-based navigation framework described herein is compared with two baseline navigators to evaluate the overall performance. Similar to previous experiments, the #CA actions are employed to measure the social compliance of a navigation behavior. In addition, the navigation success rate is computed in terms of arriving goal without collisions to evaluate the navigator's robustness.

From the results in Table 2 of FIG. 12, the AMCL localizer is sensitive to crowd density and planner type, whose navigation success rate is significantly downgraded in dense crowd scenarios such as Fountain and Canteen. The only exception is when AMCL is working with A* (shortest) whose navigation behavior (as shown by the blue trajectory in FIG. 10(a)) appears to be similar to a coastal planner, i.e., whenever the robot is about to lose its localization, it can walk towards nearby static landmarks to correct the error. In contrast, the success rate of CrowdLocalizer is stable in all three scenes, though in Conference scene with sparse pedestrians, it performs less perfect than AMCL. Besides, CrowdPlanner can dynamically follow the movement of nearby pedestrians and thus can improve the success rate compared to the A* (social) planner. In general, the combination of CrowdLocalizer and CrowdPlanner is superior in scenes with dense crowds, while in less crowded scenes, AMCL with social-aware planner achieves better results.

Real-Robot Experiments in a Rush Hour Crowd

The crowd-driven navigation system has been deployed on a wheeled robot to validate its feasibility and performance in the real world. The experiments are conducted on a university campus at rush hour to make a challenging and real scenario with dense pedestrians. First, teleoperate the robot to navigate within the crowd to construct the crowd-flow map. Next, the performance of our proposed localization and planning methods is tested. To make the navigation more robust, the crowd-driven methods are complemented with the traditional SLAM method, as we discussed in the Results section.

Proposed herein is to utilize the movement information of pedestrians, which is commonly treated as harmful noises in traditional SLAM, for mapping, localization, and social-aware planning. Compared with the geometry map in traditional SLAM, the crowd-flow map provides a new perspective for robots better understanding its surrounding dynamic scenarios. This approach has demonstrated preliminary but promising navigation performance on both simulated and real-world scenarios.

Example Computing Environment

Figure 13:
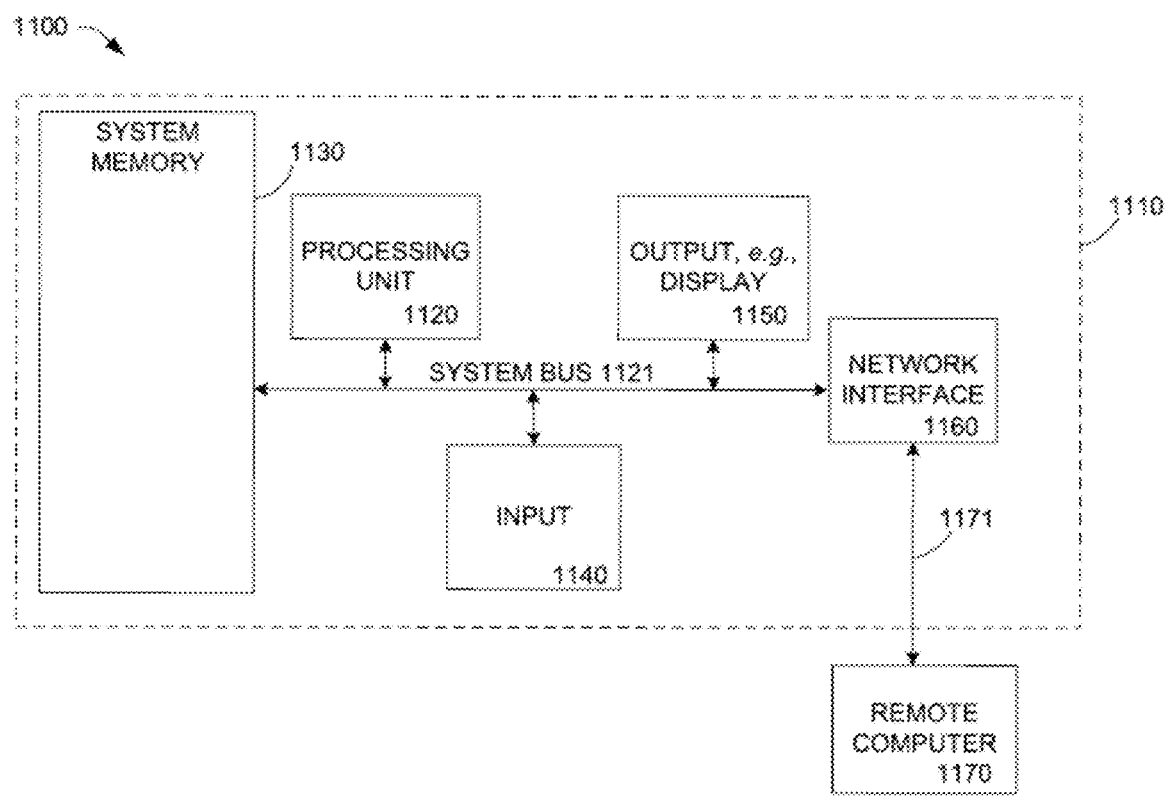
FIG. 13 illustrates a block diagram of an example electronic computing environment that can be implemented in conjunction with one or more aspects described herein.

As mentioned, advantageously, the techniques described herein can be applied to any device and/or network where analysis of data is performed. The below general purpose remote computer described below in FIG. 13 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 13 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 13, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 13 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

Example Networking Environment

Figure 14:
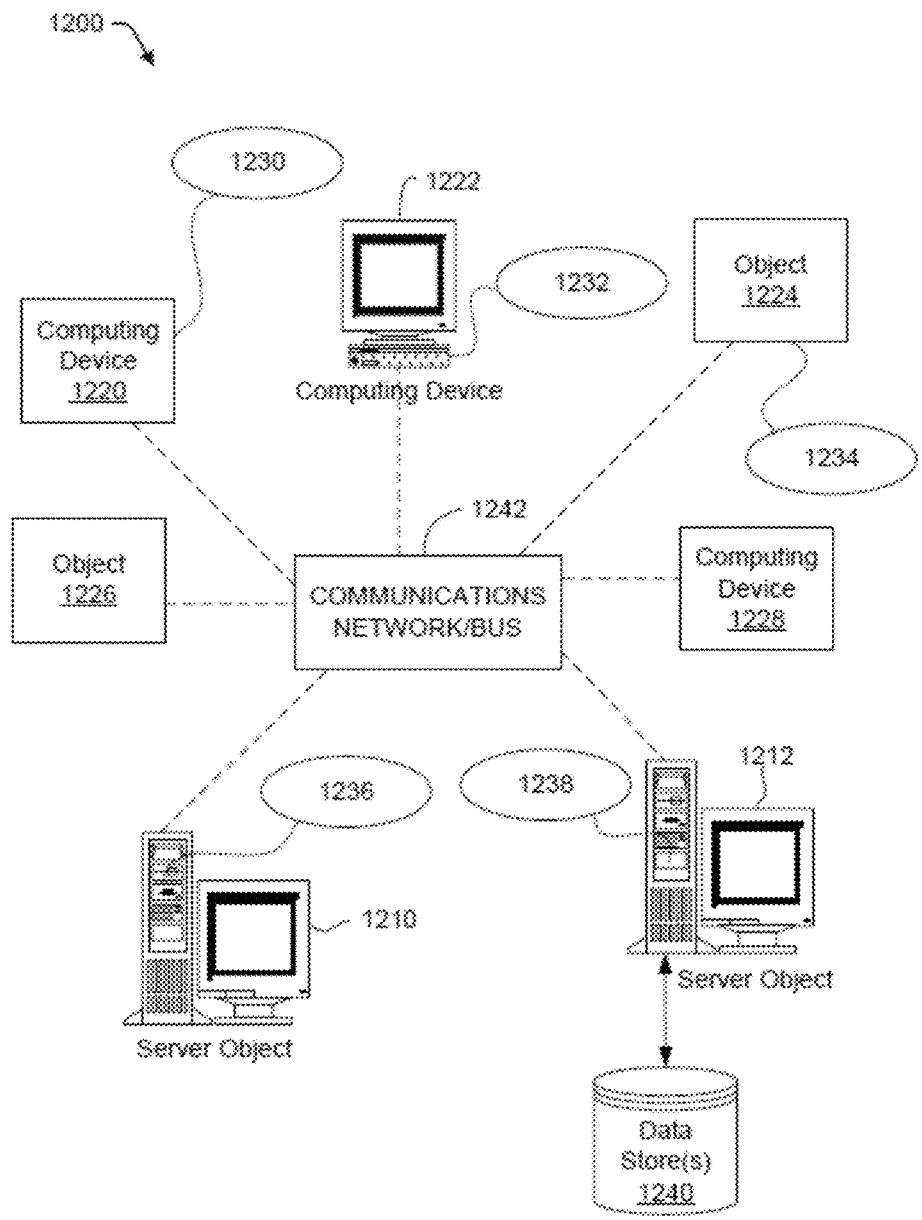
FIG. 14 depicts a block diagram of an example data communication network that can be operable in conjunction with various aspects described herein.

FIG. 14 provides a schematic diagram of an exemplary networked or distributed computing environment 1200. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include one or more cache memories, one or more registers, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 14, communications network 1242 may comprise other computing objects and computing devices that provide services to the system of FIG. 14, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 14, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of navigating a robot in a crowd, comprising:
mapping a local crowd and applying a clustering algorithm that reconstructs a crowd-flow map capturing movement patterns of pedestrians in the local crowd;
using a flow-matching metric, localizing the robot in the crowd-flow map; and
following a movement pattern in the crowd-flow map using a hierarchical crowd-driven planning on a long time horizon and a short time horizon.

2. The method according to claim 1, wherein mapping a local crowd comprises detecting and tracking local pedestrians.

3. The method according to claim 1, wherein mapping a local crowd comprises using a K-means clustering methodology to recover time-invariant crowd-flow patterns locally around the robot.

4. The method according to claim 1, wherein localizing the robot in the crowd-flow map comprises using the flow-matching metric to evaluate a matching quality between a local crowd observation and the crowd-flow map locally around a given location.

5. The method according to claim 1, wherein following a movement pattern comprises developing a resistance cost and a lubricating cost to encourage the robot to follow crowd-flow patterns.

6. The method according to claim 1, wherein reconstructing the crowd-flow map comprises fusing locals map obtained in an online manner when the robot moves around in a local area.

7. The method according to claim 1, wherein localizing the robot in the crowd-flow map using the flow-matching metric, further using a conventional geometry-matching metric, and then using the flow-matching metric and the conventional geometry-matching metric simultaneously to fuse the crowd and geometry information.

8. A robot navigating system, comprising:
a memory that stores computer executable components; and
a processor that executes the computer executable components stored in the memory, wherein the computer executable components comprise:
a crowdmapping module that maps a local crowd and applying a clustering algorithm that reconstructs a crowd-flow map capturing movement patterns of pedestrians in the local crowd;
a crowdlocalizer module that uses a flow-matching metric, localizing the robot in the crowd-flow map; and
a crowdplanner module that follows a movement pattern in the crowd-flow map using a hierarchical crowd-driven planning on a long time horizon and a short time horizon.

9. The robot navigating system according to claim 8, wherein the crowdmapping module further detects and tracks local pedestrians.

10. The robot navigating system according to claim 8, wherein the crowdmapping module further uses a K-means clustering methodology to recover time-invariant crowd-flow patterns locally around the robot.

11. The robot navigating system according to claim 8, wherein crowdlocalizer module further uses the flow-matching metric to evaluate a matching quality between a local crowd observation and the crowd-flow map locally around a given location.

12. The robot navigating system according to claim 8, wherein the crowdplanner module further develops a resistance cost and a lubricating cost to encourage the robot to follow crowd-flow patterns.

13. The robot navigating system according to claim 8, wherein the crowdmapping module further comprises fusing locals map obtained in an online manner when the robot moves around in a local area.

14. The robot navigating system according to claim 8, wherein the crowdlocalizer module further uses a conventional geometry-matching metric, and then uses the flow-matching metric and the conventional geometry-matching metric simultaneously to fuse the crowd and geometry information.

15. An autonomous vehicle comprising the robot navigating system according to claim 8.

16. A delivery device comprising the robot navigating system according to claim 8.

17. A non-transitory machine-readable storage medium, comprising executable instructions that, when executed by a processor, facilitate performance of operations, comprising:
mapping a local crowd and applying a clustering algorithm that reconstructs a crowd-flow map capturing movement patterns of pedestrians in the local crowd;
using a flow-matching metric, localizing the robot in the crowd-flow map; and
following a movement pattern in the crowd-flow map using a hierarchical crowd-driven planning on a long time horizon and a short time horizon.

18. The non-transitory machine-readable storage medium according to claim 17, wherein the operations further comprise:
mapping a local crowd comprises using a K-means clustering methodology to recover time-invariant crowd-flow patterns locally around the robot.

19. The non-transitory machine-readable storage medium according to claim 17, wherein the operations further comprise:
localizing the robot in the crowd-flow map comprises using the flow-matching metric to evaluate a matching quality between a local crowd observation and the crowd-flow map locally around a given location.

20. The non-transitory machine-readable storage medium according to claim 17, wherein the operations further comprise:
following a movement pattern comprises developing a resistance cost and a lubricating cost to encourage the robot to follow crowd-flow patterns.

* * * * *